United States Patent
Byrhult et al.

(10) Patent No.: US 12,103,428 B2
(45) Date of Patent: Oct. 1, 2024

(54) METHOD FOR MANAGEMENT OF AN ENERGY STORAGE SYSTEM OF A VEHICLE

(71) Applicant: VOLVO TRUCK CORPORATION, Gothenburg (SE)

(72) Inventors: Martin Byrhult, Gothenburg (SE); Jonas Hellgren, Gothenburg (SE); Hanna Bryngelsson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 532 days.

(21) Appl. No.: 17/431,305

(22) PCT Filed: Feb. 15, 2019

(86) PCT No.: PCT/EP2019/053874
§ 371 (c)(1),
(2) Date: Aug. 16, 2021

(87) PCT Pub. No.: WO2020/164742
PCT Pub. Date: Aug. 20, 2020

(65) Prior Publication Data
US 2022/0161682 A1  May 26, 2022

(51) Int. Cl.
*B60L 58/12* (2019.01)
*B60L 50/60* (2019.01)
(Continued)

(52) U.S. Cl.
CPC ............. *B60L 58/12* (2019.02); *B60L 50/60* (2019.02); *B60L 58/24* (2019.02);
(Continued)

(58) Field of Classification Search
CPC .......... B60L 58/12; B60L 58/24; B60L 50/60; B60L 2240/545; H01M 2220/20; H01M 10/486
See application file for complete search history.

(56) References Cited

U.S. PATENT DOCUMENTS

2011/0218688 A1   9/2011   Lentner
2013/0110296 A1*  5/2013   Khoo ................. B60L 53/14
                                                    700/286
(Continued)

FOREIGN PATENT DOCUMENTS

CN   104424396 A   3/2015
CN   105324907 A   2/2016
(Continued)

OTHER PUBLICATIONS

International Search Report and Written Opinion dated Oct. 24, 2019 in corresponding International PCT Application No. PCT/EP2019/053874, 11 pages.
(Continued)

*Primary Examiner* — Dalena Tran
(74) *Attorney, Agent, or Firm* — Venable LLP; Jeffri A. Kaminski (57) ABSTRACT

The invention relates to a method for determining an operational parameter indicative of the power capability of an energy storage system (ESS) of a vehicle, wherein the method comprises the steps of determining a state temperature of the ESS; determining an acceptable temperature increase of the ESS for a given time period based on the determined state temperature of the ESS and a maximum temperature threshold of ESS, the maximum temperature threshold being indicative of any one of a safety temperature level of the ESS and an operational life time temperature level of the ESS; and determining a maximum operational
(Continued)

power level of the ESS for the given time period based on the determined acceptable temperature increase of the ESS.

12 Claims, 3 Drawing Sheets

(51) Int. Cl.
  *B60L 58/24* (2019.01)
  *H01M 10/48* (2006.01)
(52) U.S. Cl.
  CPC ..... *H01M 10/486* (2013.01); *B60L 2240/545* (2013.01); *H01M 2220/20* (2013.01)

(56) References Cited

U.S. PATENT DOCUMENTS

| | | |
|---|---|---|
| 2014/0365065 A1 | 12/2014 | Léonard et al. |
| 2015/0066837 A1 | 3/2015 | Twarog et al. |
| 2016/0052396 A1 | 2/2016 | Tsuchiya |
| 2016/0052418 A1 | 2/2016 | Yang et al. |
| 2020/0217518 A1* | 7/2020 | Field ................. F24S 10/95 |
| 2020/0391603 A1* | 12/2020 | Ding ................. B60L 53/305 |

FOREIGN PATENT DOCUMENTS

| | | |
|---|---|---|
| CN | 107614313 A | 1/2018 |
| JP | 2011083124 A | 4/2011 |
| WO | 2018099561 A1 | 6/2018 |

OTHER PUBLICATIONS

International Preliminary Report on Patentability dated May 18, 2021 in corresponding International PCT Application No. PCT/EP2019/053874, 36 pages.

Chinese Office Action dated Jan. 17, 2024 in corresponding Chinese Patent Application No. 201980091712.X, 22 pages.

* cited by examiner

METHOD FOR MANAGEMENT OF AN ENERGY STORAGE SYSTEM OF A VEHICLE

CROSS-REFERENCE TO RELATED APPLICATIONS

This application is a U.S. National Stage application of PCT/EP2019/053874, filed Feb. 15, 2019, and published on Aug. 20, 2020, as WO 2020/164742 A1, all of which is hereby incorporated by reference in its entirety.

TECHNICAL FIELD

The invention relates to a method for determining an operational parameter indicative of the power capability of an energy storage system of a vehicle. Also, the invention relates to an energy storage system of a vehicle comprising a control unit. Further, the invention relates to an electric propulsion system comprising such an energy storage system. Moreover, the invention relates to a vehicle comprising such an energy storage system.

The invention can be applied in any type of hybrid vehicles or electrical vehicles, such as partly or fully electrical vehicles. Although the invention will be described with respect to an electrical truck, the invention is not restricted to this particular vehicle, but may also be used in other hybrid or electrical vehicles such as electrical buses, and electrical cars. The invention may also be applied in any other type of electrical vehicle such as electrical powered construction equipment, electrical working machines e.g. wheel loaders, articulated haulers, dump trucks, excavators and backhoe loaders etc.

BACKGROUND

In connection with charging and discharging of an energy storage system of a vehicle, e.g. an electrical energy storage system having a number of rechargeable batteries, there is generally a desire to ensure adequate solutions for reliable supply and delivery of electric power between various types of electrical equipment, such as batteries, power source such as electrical machines, and external electric network.

While the quality of batteries is partly dependent on the quality of each battery cell of the battery, battery cells may nevertheless have somewhat different capacities. In addition, despite the high quality of battery cells, batteries and battery cells may often age differently due to e.g. different operating temperature of each battery cell. Accordingly, characteristics of the batteries and battery cells in a vehicle often differs relative each other. By way of example, the state-of-charge (SOC) for battery cells within a battery pack will eventually drift apart leading to an uneven SOC distribution which limits the operational performance of the entire battery. In other words, the SOC may typically have an impact on the state-of power (SOP) of the battery as well as on the power capability of the battery, e.g. the ability to charge and discharge the battery under ordinary use of the battery in the vehicle.

At least for these reasons, it would be desirable to have an adequate knowledge of the battery properties during ordinary use of a vehicle in order to perform various operational activities in a secure and reliable manner. Therefore, in order to obtain a sufficient level of information indicative of the battery properties, these types of vehicles may include an energy management unit, sometimes denoted as a battery management system, which is configured to monitor and estimate one or more operational parameters or conditions of one or more batteries.

By way of example, US 2015/0066837 A1 discloses a method for predicting a duration of a future charging process for a vehicle battery, the method comprising the steps of estimating a future charge amount of the battery and estimating a future temperature of the battery. Further, the method comprises the step of determining a future charging power to be applied to the battery during the future charging of the battery.

In order to avoid using the battery in an unfavourable manner during driving, some electrical vehicle systems may also be adapted to use the battery with a type of safety margin in relation to the actual operational SOC level of the battery. However, this typically set a restriction on the available energy supply from the battery, and thus also reduces the vehicle range. In some operational situations, in which there is a high power demand from the vehicle, the vehicle may not have enough power to operate as expected if one battery pack (or a number of battery packs) of the battery is on a critical low level of charge. Hence, some energy storage systems may be provided with an alert system arranged to provide a fault indication or alert that one or more battery packs are operating on a critical low level of charge.

Despite the activity in the field, there remains a need for an improved control of a vehicle energy storage system of a partly or fully electrical vehicle. In addition, it would be desirable to further improve the overall performance of the vehicle energy storage system during operation of the vehicle.

SUMMARY

An object of the invention is to provide an improved method for determining the operational power level of a vehicle energy storage system. The object is at least partly achieved by a method according to claim 1.

According to a first aspect of the invention, there is provided a method for determining an operational parameter indicative of the power capability of an energy storage system (ESS) of a vehicle, wherein the method comprises the steps of:
 determining a state temperature of the ESS;
 determining an acceptable temperature increase of the ESS for a given time period based on the determined state temperature of the ESS and a maximum temperature threshold of the ESS, the maximum temperature threshold being indicative of any one of a safety temperature level of the ESS and an operational life time temperature level of the ESS; and
 determining a maximum operational power level of the ESS for the given time period based on the determined acceptable temperature increase of ESS.

In this manner, the method according to the example embodiments allows for operating a vehicle in a reliable and efficient manner by taking the temperature increase of the ESS into consideration when determining the maximum possible operational power level of the ESS for a given time period. By using the determined acceptable temperature increase of the ESS for the given time as an input to determining the operational power level of the ESS for the given time, it becomes possible to improve predictability of the power capability of the ESS, thus improving the predictable drivability of the vehicle.

As such, it is believed that the maximum operational power level of the ESS can be determined in a more accurate manner compared to available prior art methods and systems, such as methods based on various statistics and tables of offline tests of determined power limits of the ESS for a number of different time horizons and/or derate functions triggered on voltage or SOC limit violations. Such derate functions generally suffer from predictability and are often set with a high safety margin.

The example embodiments of the invention are based on the observation that available power output and power input of an ESS, such as a battery, vary depending on the temperature. Available power output may generally, although strictly not necessary, refer to available state-of-power (SOP). While the available power output level from the ESS is typically better at high temperatures of the battery, it may not be appropriate to operate the battery at too high temperatures as there is a negative correlation between the life time of the battery and the temperature of the battery. In addition, batteries are often designed to restrict power output or power input at a predefined temperature level for reasons of safety etc. Therefore, by the method according to the example embodiments, the estimated temperature increase is taken into account when determining the maximum operational power level of the battery.

If the ESS is provided in the form of a battery or battery unit assembly, it should also be readily appreciated that the maximum operational power level of the battery may vary depending on a number of additional aspects, such as near history power usage of the battery, SOC of the battery, battery age etc. Therefore, in some example embodiments, the method may optionally take such aspects into consideration when determining the maximum operational power level. To this end, the contribution from determining the maximum operational power level of the ESS for the given time period based on the determined acceptable temperature increase of ESS allows for determining the maximum level of power that is possible for the given time period without exceeding a predefined temperature limit.

In other words, the invention is based on the insight that an increase in temperature of the ESS for a given time affects the available maximum operational power level of the ESS for the given time. The method is particularly useful for an implementation in hybrid and electrical vehicles, where it is beneficial if a constant amount of power output (corresponding to driving, i.e. discharging of the ESS) and power input (i.e. charging of the ESS) can be guaranteed during a defined period of time using the electric motor or electric machine for traction or regeneration. For example, in an ordinary driving sequence of an electrical truck, it is often required to ensure that unexpected power drops will not occur, for instance at an electric take-off of the vehicle. In such situations, it would be beneficial that a power delivery promised when starting the acceleration can be maintained during the predefined time period of the take-off. In a similar vein, it would be beneficial to secure that a correct amount of power can be charged into the battery during a certain period of time. By way of example, it would be beneficial to secure that a correct amount of power can be charged into the battery when the vehicle is at a plug-in charging station or subject to a downhill regeneration.

In the context of the example embodiments, the term "maximum operational power level" refers to the prevailing total maximum operational power provided by the energy storage system for the given time based on the acceptable temperature increase of the ESS.

According to one example embodiment, the maximum operational power level refers to the state-of-power (SOP) level of the ESS.

When the ESS is a battery unit assembly, the prevailing total maximum operational power is typically determined when all battery units of the battery unit assembly are connected, i.e. activated to provide electrical power to the vehicle. Thus, as an example, if the energy storage system comprises three battery units, the total operational power refers to the possible maximum power provided by the energy storage system when all the three battery units are connected and activated to provide power. By way of example, the total operational power is derivable from the state-of-power (SOP) of the ESS when all battery units of the battery unit assembly are connected to each other in the ESS. In some example embodiments, it is also possible that the maximum operational power level is indicative of any one of a maximum electrical current level, maximum power output and maximum power input of the ESS for the given period of time.

In the context of the example embodiments, the term "operational parameter", as used herein, typically refers to a parameter indicative of the state-of-power (SOP) of the ESS. The SOP is determined in order to ensure a sufficient level of power output and/or input (i.e. both charge and discharge) during a given period of time. Such operational parameter may advantageously be used for indicating the power capability of a battery of a vehicle.

In the context of the example embodiments, the term "power capability" typically refers to the charge and discharge capability of the ESS. For example, the term "power capability", as used herein, typically refers to the charge and discharge capability of the battery. The capability to charge and discharge the battery generally refers to a condition of the battery under ordinary use of the battery in the vehicle. As mentioned above, the state-of-power (SOP) parameter is one example of an operational parameter indicative of the power capability of the ESS.

The maximum temperature threshold value may typically be a predetermined value stored in the control unit. In addition, or alternatively, the maximum temperature threshold value is updated based on the ordinary use of the ESS. According to one example embodiment, the maximum temperature threshold value is a combination of a predetermined value indicative of the ESS safety temperature level and the ESS operational life time temperature level.

In the context of the example embodiments, the term "safety temperature level" typically refers to a critical safety operational temperature level of the ESS, e.g. a critical safety operational temperature level of the battery or the battery cells making up the battery. The critical safety temperature level may e.g. relate to a predefined maximum allowable temperature level of the ESS for safety reasons. The critical safety temperature level is generally derivable from the manufacturer of the ESS and subsequently stored in the control unit. Such ESS safety temperature level is also generally set with a high safety margin by the battery manufacturer. Further, such ESS safety temperature level is generally a predefined static operational temperature level.

In the context of the example embodiments, the term "operational life time temperature level", as used herein, typically refers to an operational life time temperature level of the ESS, e.g. the operational life time temperature level the battery. The operational life time temperature level is defined in respect to a maximum allowable temperature level of the ESS for reducing ageing and degrading of the battery cells. Thus, the operational life time temperature level contains temperature data of the maximum allowable temperature of the ESS for reducing ageing and degrading of the battery cells. The use of the ESS operational life time temperature level in the maximum temperature threshold value ensures that the acceptable temperature increase is set in order to protect the ESS from degrading. The operational life time of the ESS, such as a battery, is generally a measure of battery performance and longevity, which can be quantified in a number of different ways, e.g. as run time on a full charge or as the number of charge cycles until the end of useful life. As such, the ESS operational life time temperature level generally depends on the charge and discharge activity of the battery. In other words, the ESS operational life time temperature level contains temperature data of the maximum allowable temperature of the ESS in respect of the operational life time of the ESS, i.e. a maximum allowable temperature of the ESS prolonging the operational life of the ESS. The operational life time of the ESS varies depending on the ordinary use of the ESS and the vehicle, e.g. the operational life time typically depends on the charge and discharge activity of the ESS. The operational life time temperature level may be variable temperature level that may change based on the ordinary use of the ESS and the vehicle. Thus, the operational life time temperature level of the ESS may sometimes be denoted as a soft or dynamic temperature level. In one example embodiment, the operational life time temperature level is based on the charge and discharge activity of the battery. Hence, the operational life time temperature level may be derivable from data relating to the charge and discharge activity of the battery. Typically, such data is transferred from the ESS to the control unit during ordinary use of the ESS, and may be stored in the control unit.

Operational life time temperature level may vary depending on the type of battery pack assembly, the type of ESS as well as on the type of vehicle. By way of example, the operational life time temperature level may be about 30° C. to 40° C. It may also be conceivable that the operational life time temperature level is generally lower than the safety temperature level.

The state temperature of the ESS is typically a reading of a present temperature level of the ESS, e.g. by a temperature sensor. Alternatively, the state temperature may be determined directly by a battery control unit via a model of the ESS, e.g. a model of the battery.

According to one example embodiment, the step of determining an acceptable temperature increase of the ESS for a given time period based on the determined state temperature of the ESS and a maximum temperature threshold of the ESS comprises determining a first acceptable temperature increase of the ESS for the given time period when the maximum temperature threshold is indicative of the safety temperature level of the ESS and a second acceptable temperature increase of the ESS for the given time period when the maximum temperature threshold is indicative of the operational life time temperature level of the ESS. In addition, in this example embodiment, the step of determining a maximum operational power level of the ESS for the given time period based on the determined acceptable temperature increase of the ESS comprises determining a first maximum operational power level of the ESS for the given time period based on the determined first acceptable temperature increase of the ESS and a second maximum operational power level of the ESS for the given time period based on the determined second acceptable temperature increase of the ESS; and further comprising the step of comparing the first maximum operational power level of the ESS with the second maximum operational power level of the ESS.

According to one example embodiment, the step of determining a state temperature of the ESS comprising the step of obtaining data indicative of the temperature of the ESS. The data indicative of temperature of the ESS can be gathered from measuring the temperature level of the battery cells of the battery. In addition, or alternatively, the temperature level of the ESS can be gathered from measuring the temperature of the cooling medium arranged to regulate the temperature of the ESS.

According to one example embodiment, the method further comprises the step of controlling a temperature of the ESS based on the determined maximum operational power level of the ESS. By way of example, the method is configured to regulate the state temperature of the ESS, based on the determined maximum operational power level of the ESS for the given time period, in order to ensure that the ESS can deliver an adequate level of power (electrical energy) during the given time period. In this manner, the method allows for an improved temperature optimization of the ESS for the given time period.

In addition, or alternatively, the method may further comprise the step of controlling a future power demand of the ESS based on the determined maximum operational power level of the ESS. By way of example, the method is configured to regulate the available power supply of the ESS based on the determined maximum operational power level of the ESS for the given time period to ensure that the ESS can deliver an adequate level of power (electrical energy) during the given time period.

Accordingly, the method of the example embodiments allows for using the determined maximum operational power level as an operational parameter for the vehicle in order to prepare for upcoming situations. By estimating the maximum available operational power level for certain temperature increases for various time periods, i.e. estimating how the temperature increases at different circumstances, it becomes possible to estimate the desired temperature of the ESS before a certain circumstance. For example, it becomes possible to estimate the desired starting temperature of the ESS at the charging station, assuming a certain power need and a predefined time. This information can be used in order to influence the cooling/heating strategy of the ESS before arriving at the charging station, thereby increasing the level of energy that it is possible to charge into the ESS.

According to one example embodiment, the method further comprises the step of receiving an indication of an up-coming charging event and the step of estimating a desired temperature of the ESS at the up-coming charging event based on the indication of the up-coming charging event. The desired temperature of the ESS at the up-coming charging event typically corresponds to the starting temperature of the ESS at the charging station. The indication of the up-coming charging event may e.g. be transmitted from the charging station and received by a control unit comprised with the vehicle.

According to one example embodiment, the method further comprises the step of controlling a temperature of the ESS based on the determined maximum operational power level of the ESS and the estimated desired temperature of the ESS at the up-coming charging event. In this manner, the method is arranged to provide temperature optimization of the ESS. Temperature optimization may be performed by disconnecting battery units that have low or high temperature when the prevailing power level of the ESS still fulfils the performance requirement with reduced number of battery units. The battery unit that is not connected can then be heated or cooled before re-connected.

In addition, it becomes possible to estimate whether the power provided by the energy storage system is sufficient for providing traction power for the given time to the upcoming event or to the upcoming charging activity, e.g. until the next charging location. To this end, the method is capable of estimating whether the vehicle should continue using all battery units of the battery unit assembly for providing electrical power to the electric propulsion system, e.g. to the electrical motor, or if vehicle should be operated with reduced capacity, i.e. using less number of battery units than the total available number of battery units in the battery unit assembly, or with a lower level of power.

According to one example embodiment, the method further comprises updating the ESS operational life time temperature level in response to a change in an operational condition of the energy storage system.

According to one example embodiment, the method further comprises the step of updating the acceptable temperature increase parameter for the given time in response to the change in an operational condition of the energy storage system. Hence, according to one example embodiment, the method may further comprise the step of determining a change in an operational condition of the ESS. Typically, the operational condition comprises any one of the following parameters: a time to a charging event and magnitude of the charging event, a time to a discharging event and magnitude of the discharging event, a range of driving cycle, a required driving range, or combinations thereof. In other words, the method can be configured to determine whether the current state of the energy storage system can provide a sufficiently high level of electrical power for the given period of time in view of upcoming events, e.g. an upcoming up-hill slope.

According to one example embodiment, the given time period is a predefined static time period. Alternatively, the given time period is a dynamic time period updated during operation of the vehicle. The extent of the time period may vary for various operations and activities of the ESS and the vehicle, and may also vary depending on type of installation, application and vehicle. However, by way of example, the given time period generally refers to a time period between about 1 minutes to 20 minutes. Still preferably, the given time period may refer to a time period between about 2 minutes to 15 minutes. Still preferably, the given time period may refer to a time period between about 5 minutes to 12 minutes.

According to one example embodiment, the steps of the method are performed in a sequence. However, at least some of the steps of the method can be performed concurrently.

The method according to the example embodiments can be executed in several different manners. Generally, the steps of the method according to the example embodiments may be performed by a control unit. According to one example embodiment, the steps of the method are performed by a control unit during use of the energy storage system by an electric propulsion system. Generally, the term "electric propulsion system", as used herein, typically refers to vehicle electrical components for providing energy (such as traction energy) and for storing energy (delivering and receiving energy). Besides the electrical components such as the energy storage system, including the battery unit assembly, as mentioned above, an electric propulsion system may include additional components, e.g. cable(s), sensor(s), control units, battery management unit(s) etc. The electric propulsion system is in particular configured to deliver and receive energy for providing propulsion to the vehicle, but also for performing various vehicle operations of the vehicle.

One component of the electric propulsion system is the energy storage system. The energy storage system generally has a plurality of battery units connectable to form a battery unit assembly. Typically, the battery units of the plurality of battery units are individual battery units. Accordingly, the ESS can be provided in several different manners. By way of example, the ESS is a battery unit assembly having a plurality of connected battery units. The battery unit assembly is comprised in the vehicle for providing traction power to the electric propulsion system. Each battery unit may be a battery cell string comprising a number of interconnected single battery cells, whereby the battery unit assembly is a battery pack for the vehicle. In this example embodiment, the plurality of battery units corresponds to a multiple numbers of individual battery strings connectable to form a battery unit assembly in the form of a battery pack. Alternatively, each battery unit is a battery pack comprising a plurality of battery cell strings. In this case, the battery unit assembly comprises a plurality of battery packs forming a battery pack assembly. Thus, in this example embodiment, the plurality of battery units corresponds to a multiple numbers of individual battery packs connectable to form a battery pack assembly. It is to be noted that the battery cells are generally connected in series in the battery pack, while the battery packs are connected in parallel. The battery cells may however be both connected in series and in parallel in the form of battery cell strings. Accordingly, the battery units (battery packs) are typically connected in parallel in the battery unit assembly (battery pack assembly). However, the battery cells are typically connected in series in the battery cell string, while the battery cell strings are typically connected in parallel in the battery pack.

It is to be noted that the battery unit assembly can refer to one or several number of battery pack(s). In addition, it is to be noted that the battery unit assembly can include different types of batteries. By way of example, any one of the batteries in the battery unit assembly is any one of a lithium-ion battery or sodium-ion battery. A sodium-ion battery typically includes any type of sodium iron battery or sodium ferrite battery. The battery unit assembly thus typically comprises a set of battery pack. Also, it is to be noted that the battery pack is generally a so called high voltage battery pack. In this context, the term "high voltage" refers to a battery pack of about 400-1000 voltage (V).

Further, the term "power", as used herein, typically refers to electrical power. Electrical power is the product of voltage and current.

It may also be possible that the ESS is a fuel cell system. In addition, it should be readily appreciated that the ESS may be a combination of batteries and fuel cells.

In the context of the example embodiments of the invention, the term "state-of-power (SOP)", as used herein, refers to the available power at the present status of the battery unit assembly. In particular, the SOP refers to available dischargeable power or available chargeable power of the battery unit assembly at the present status of the battery unit assembly. The SOP can be determined for different time periods.

In the context of the example embodiments of the invention, the term "state-of-charge (SOC)", as used herein, refers to the available capacity at the present status of the battery unit assembly. The SOC may also include or represent the charge level of a battery cell, a single battery unit, a single battery pack, the electrical energy storage system or a combination thereof. The SOC is typically determined in percentage (%) between available capacity and rated capacity of a new battery cell or current capacity or a battery cell. In electrical vehicles comprising a battery pack assembly, the SOC has several different purposes, e.g. it may be used as an input to other battery management functions, including but not limited to SOP, SOQ, SOR, SOE, in overall vehicle energy management, in a charging strategy, as input to an life time estimator, as input to an ageing time estimator and as input when analysing fault cases or a combination thereof.

Typically, although not strictly required, the step of determining a state temperature of the ESS is performed by temperature sensor unit configured to monitor the temperature of one or a plurality of battery units. Thus, the temperature sensor unit is configured to receive information indicative of the temperature of one or a plurality of battery units at a given point in time. It should be readily appreciated that the step of monitoring the state temperature of the battery units is typically performed over time. By way of example, the step of monitoring the temperature of the battery units is performed by arranging a temperature measuring sensor configured to measure the temperature of each one of the battery units making up the battery unit assembly. According to one example embodiment, the ESS comprises the sensor unit. The sensor unit may be any type of sensor unit capable of measuring temperature of a battery unit. These types of sensor units are commonly available and several different options are conceivable.

As mentioned above, the example embodiments of the method and the sequences of the methods, typically corresponding to the steps of the method, are executed by the control unit. Thus, according to one example embodiment, the steps of the method are performed by the control unit during use of the electric propulsion system. The method may be continuously running as long as the vehicle is operative, but also continuously running when the vehicle is in a non-operative state while the battery unit assembly is used, e.g. during a charging operation. Accordingly, the phrase "during use of the battery unit assembly" may refer to the state of charging of the battery unit assembly, and to the state of using the battery unit assembly during operation of the vehicle, e.g. driving of the vehicle.

The sequences of the method may likewise be performed by other types of components and by other technologies as long as the method can provide the associated functions and effects. Moreover, the method can likewise be implemented for controlling a model of the ESS (or the battery), the model comprising an equivalent circuit of the battery units making up the vehicle electrical energy storage system. A common type of a battery model comprises an equivalent circuit model through which current-voltage characteristics may be obtained for the model battery.

According to a second aspect of the present invention, there is provided a computer program comprising program code means for performing the steps of any one of the example embodiments of the first aspect when the program is run on a computer. Effects and features of the second aspect of the invention are largely analogous to those described above in connection with the first aspect.

According to a third aspect of the present invention, there is provided a computer readable medium carrying a computer program comprising program code means for performing the steps of any of the embodiments of the first aspect when the program product is run on a computer. Effects and features of the third aspect of the invention are largely analogous to those described above in connection with the first aspect.

According to a fourth aspect of the present invention, there is provided an energy storage system for a vehicle. The energy storage system (ESS) comprises a multiple number of battery units connectable to form a battery unit assembly, and a control unit configured to determine a state temperature of the ESS. The control unit is further configured to determine an acceptable temperature increase of the ESS for a given time period based on the state temperature of the ESS and a maximum temperature threshold of ESS. The maximum temperature threshold is indicative of any one of a safety temperature level of the ESS and an operational life time temperature level of the ESS. Further, the control unit is configured to determine a maximum operational power level of the ESS for the given time period based on the determined acceptable temperature increase of the ESS. Effects and features of the fourth aspect of the invention are largely analogous to those described above in connection with the first aspect.

According to a fifth aspect of the present invention, there is provided an electric propulsion system for a vehicle. The electric propulsion system comprises an energy storage system according to any one of the example embodiments above, and an electrical motor for providing power to the vehicle. The energy storage system is further connected to the electrical motor to provide power to the electrical motor. Hence, the electrical energy storage system is typically a part of the electric propulsion system. Effects and features of the fifth aspect of the invention are largely analogous to those described above in connection with the first aspect.

The electrical motor can be provided in several different manners. According to one example embodiment, the electrical motor is any one of a permanent magnet synchronous machine, a brushless DC machine, an asynchronous machine, an electrically magnetized synchronous machine, a synchronous reluctance machine or a switched reluctance machine. Typically, the electrical motor is configured for driving at least a ground engaging member. Typically, the electric motor is configured for driving a pair of ground engaging members. By way of example, the ground engaging member is a wheel, a track or the like. The electrical motor can be coupled to the ground engaging members in several different manners. In one example embodiment, the electrical motor is coupled to a pair of ground engaging members by means of a transmission and a clutch. The transmission typically comprises a number of gears including a neutral gear.

The term "control unit", as used herein, is typically, although strictly not necessary, an electronic control unit. The control unit may include a microprocessor, microcontroller, programmable digital signal processor or another programmable device. Thus, the control unit comprises electronic circuits and connections as well as processing circuitry such that the control unit can communicate with the ESS, and with different parts of the electric propulsion system such as the electrical machines and any other parts in need of being operated in order to provide the functions of the example embodiments. Typically, the control unit may also be configured to communicate with other parts of the vehicle such as the brakes, suspension, the clutch, transmission and further electrical auxiliary devices, e.g. the air conditioning system. The control unit is generally configured to control and monitor the ESS (or the battery pack assembly). Typically, although strictly not required, the control unit includes the battery management unit configured to monitor battery cell characteristics such as state of charge (SOC) and open circuit voltage of the battery cells. Other functions of the battery management unit may relate to safety functions, such as state-of-power, and/or closing the contactors. The control unit may comprise modules in either hardware or software, or partially in hardware or software and communicate using known transmission buses such as CAN-bus and/or wireless communication capabilities. The processing circuitry may be a general purpose processor or a specific processor. The control unit typically comprises a non-transitory memory for storing computer program code and data upon. Thus, the control unit may be embodied by many different constructions.

In other words, the control functionality of the example embodiments of the ESS may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions. While the example embodiments of the ESS described above includes a control unit being an integral part thereof, it is also possible that the control unit may be a separate part of the vehicle, and/or arranged remote from the ESS and in communication with the ESS.

The control unit may also include a model of one battery unit or a plurality of battery units, or a combination thereof. Thus, the energy storage system typically includes the control unit configured to control the functionality of the ESS. If the ESS comprises a battery pack assembly, the battery pack assembly may include the control unit configured to control the functionality of the battery pack assembly.

According to a sixth aspect of the present invention, there is provided a vehicle, such as a fully or hybrid electrical vehicle, comprising an ESS according to any one of the example embodiment mentioned above and/or an electric propulsion system according to any one of the example embodiment mentioned above. Effects and features of the sixth aspect of the invention are largely analogous to those described above in connection with the first aspect. The vehicle may be an electrical, hybrid, or plug-in hybrid vehicle comprising an electrical motor, wherein the ESS provides power to the electrical motor for providing propulsion for the electrical, hybrid, or plug-in hybrid vehicle. It is to be noted that the vehicle can therefore be either a partly of fully electrical vehicle.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

With reference to the appended drawings, below follows a more detailed description of embodiments of the invention cited as examples.

DETAILED DESCRIPTION OF EXAMPLE EMBODIMENTS OF THE INVENTION

The present invention will be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The skilled person will recognize that many changes and modifications may be made within the scope of the appended claims. Similar reference characters refer to similar elements throughout the description.

Figure 1A:
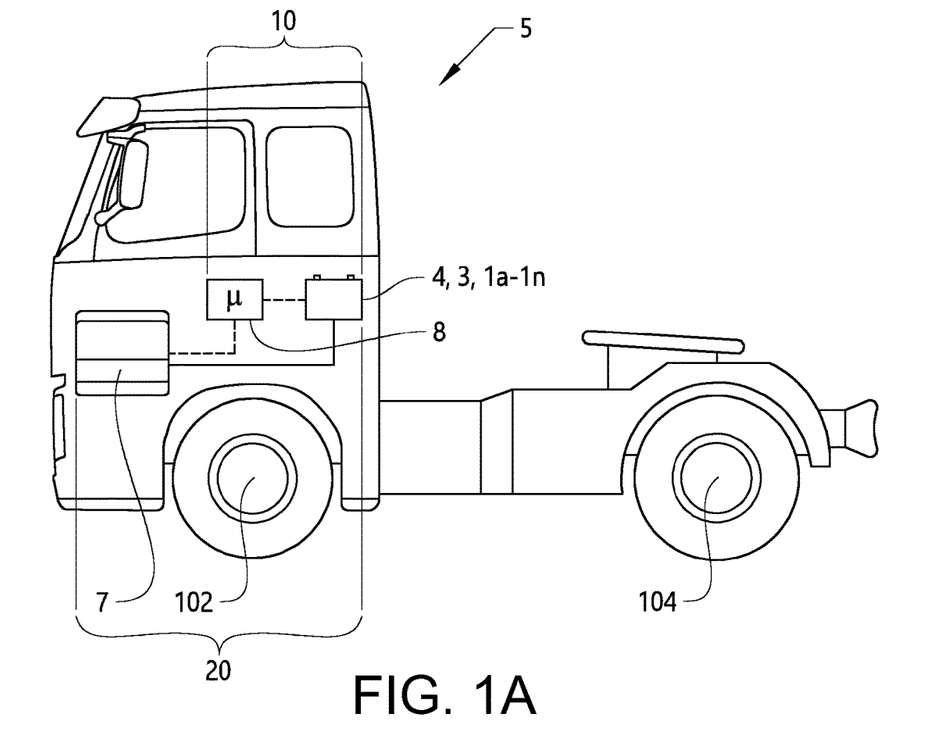
FIG. 1A is a side view of a vehicle in the form of an electrical truck, in which an energy storage system (ESS) operable by a method according to the present invention may be incorporated.
Figure 1B:
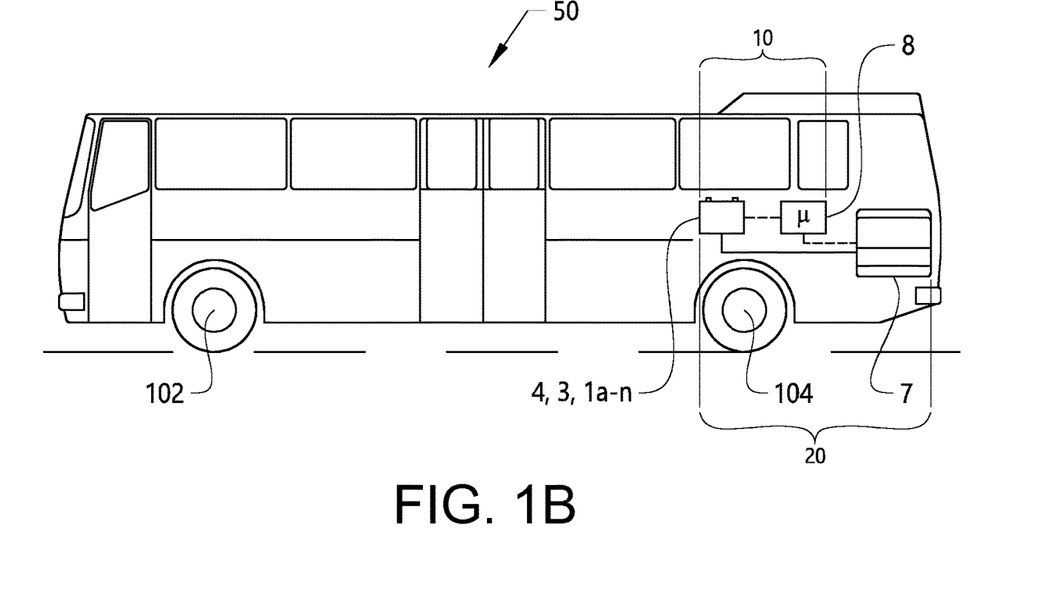
FIG. 1B is a side view of a vehicle in the form of an electrical bus, in which an energy storage system (ESS) operable by a method according to the present invention may be incorporated.

Referring now to the drawings and to FIG. 1A in particular, there is depicted an exemplary vehicle, here illustrated as an electrical truck 5. In this example, the electrical truck is a fully electrical vehicle. The electrical truck 5 comprises an electric propulsion system 20 configured to provide traction power to the vehicle. The electric propulsion system thus comprises an electrical energy storage system 10 and an electrical motor 7. The electrical energy storage system 10 is connected to the electrical motor 7 to provide power to the electrical motor, thereby the electrical motor can provide traction power to one or more ground engaging members, e.g. one or more wheels 102 and 104. It should be noted that the electric propulsion system can also be adapted to manage various types of electronic functions of the vehicle. The electric propulsion system 20 may of course be implemented, possibly in a slightly different way, in a bus 50 as shown in FIG. 1B, a car, etc. The electric propulsion system is operable by a method according to any one of the example embodiments as described in any one of the FIGS. 3 and 4.

As mentioned above, the electrical propulsion system 20 including the electrical motor(s) is configured for driving the pair of ground engaging members 102, 104 in the form of wheels. Optionally, the electrical propulsions system comprises a transmission (not shown) for transmitting a rotational movement from the electric motor(s) to a propulsion shaft, sometimes denoted as the drive shaft (not shown). The propulsion shaft connects the transmission to the pair of wheel 102, 104. Furthermore, although not shown, the electrical motor is typically coupled to the transmission by a clutch.

For ease of reference, the electrical energy storage system may generally be denoted as the energy storage system (ESS). The ESS 10 here comprises a battery unit assembly 4. The battery unit assembly typically includes a plurality of battery units $1_a$ to $1_n$. In the electrical energy storage system depicted in FIG. 1A, each battery unit is a battery pack. In this context, the battery pack is a battery comprising a plurality of battery cells 3. As such, each one of the battery units $1_a$ to $1_n$ comprises a plurality of battery cells 3. To this end, the electrical energy storage system comprises a multiple number of battery packs connected to form the battery unit assembly 4. In the following description of the example embodiments, the battery unit will sometimes be referred to as a battery pack and the battery unit assembly as a battery pack assembly. Typically, as depicted in FIG. 1A, the electrical truck 5 further comprises a control unit 8 configured to control and monitor the ESS 10. In this example, the control unit is an electronic control unit. By way of example, the electronic control unit is configured to operate the ESS according to any one of the example embodiments of a method, as described in any one of the FIGS. 3 and 4.

Figure 2:
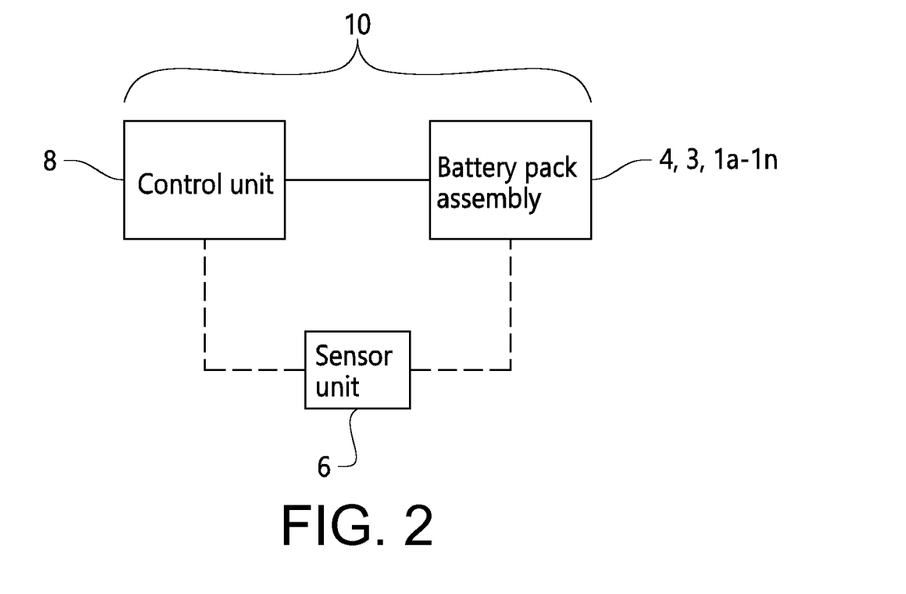
FIG. 2 schematically illustrates parts of an electric propulsion system comprised as a component of propulsion means for e.g. the vehicles shown in FIGS. 1A and 1B, in which the electrical propulsion system has an energy storage system (ESS) in the form of a battery unit assembly and a control unit for operating the ESS according to an example embodiment of the present invention.

One example embodiment of an ESS that may be incorporated in any one of the FIG. 1A and FIG. 1B is illustrated in FIG. 2. In particular, FIG. 2 schematically illustrates further details of the ESS 10 according to the example embodiment in FIG. 1A. The ESS is here a DC on-board energy storage system in the form of a battery pack assembly. The battery pack assembly 4 is arranged to provide electrical power to the electrical motor (FIG. 1A), i.e. to provide propulsion for the electrical truck 5. By way of example, each one of the battery packs is a lithium-ion battery. Moreover, each one of battery packs comprises a plurality of battery cells 3. For instance, the battery pack assembly may comprise seven battery packs. The number of battery packs in the battery pack system and the number of battery cells in each battery pack vary depending on the type of the vehicle, the type of installation, etc. In this example, the battery cells are connected in series in each one of the battery packs. Further, the battery packs are generally connected in parallel. The ESS 10 may also be arranged to power one or more internal auxiliary components commonly denoted as an auxiliary system of the vehicle. The auxiliary system can include several different components. One example of an auxiliary component is an air conditioning system (although not shown).

In particular, the ESS 10 here comprises the control unit 8 (including the battery management unit) and the battery pack assembly 4. The control unit is configured to determine a state temperature of the ESS. In addition, as further described herein, the control unit is configured to determine an acceptable temperature increase of the ESS for a given time period based on the state temperature of the ESS and a maximum temperature threshold of ESS. The maximum temperature threshold is generally indicative of any one of a safety temperature level of the ESS and an operational life time temperature level of the ESS.

Moreover, the control unit 8 is arranged to determine a maximum operational power level of the ESS for the given time period based on the determined acceptable temperature increase of the ESS. Further details of the arrangement of the control unit and its operation are described in relation to FIGS. 3 and 4.

The data indicative of the temperature of the ESS can be gathered from measuring the temperature level of the battery cells 3 of the battery pack assembly 4. By way of example, the data indicative of the temperature of the ESS can be gathered from measuring the temperature level of the battery cells 3 of each one of the battery packs $1a$ to $1n$ making up the battery pack assembly 4. In addition, or alternatively, the temperature level of the ESS can be gathered from measuring the temperature of the cooling medium arranged to regulate the temperature of the battery pack assembly, i.e. the battery cells of the battery packs.

The temperature level of the battery pack assembly, i.e. the battery cells of the battery pack assembly is here measured by a sensor unit arranged in connection with the battery cells. Hence, the ESS 10 typically comprises the sensor unit 6 for measuring state temperature levels of the battery pack assembly 4. The sensor unit 6 is here a separate part of the ESS connected to the control unit 8 and the battery pack assembly 4. It is also possible that the sensor unit is an integral part of the control unit 8.

Each battery pack of the battery pack assembly is operatively connected to the sensor unit in order to permit the sensor unit to gather the relevant data regarding temperature of the battery pack assembly and the battery cells. The sensor unit should at least be configured to communicate with the control unit 8, i.e. to transmit data relating to relevant measurements as mentioned herein. The sensor unit 6 may be a temperature sensor configured to measure temperature in degrees Celsius. These types of sensor units are commonly available and several different options are conceivable. The system generally uses a sensor unit, or a sensor assembly comprising a number of sensor units, configured to measure temperature of all battery cells of the batter pack assembly.

The data relating to the state temperature of the battery pack assembly is transmitted to the control unit 8 for further processing. The communication between the sensor unit and the control unit can be made by a wire connection, wirelessly or by any other technology such as Bluetooth or the like.

The data relating to temperature may also be obtained from a model of the battery pack assembly, as is generally used in the field of battery pack assemblies for vehicles. The model typically comprises an equivalent circuit of the battery pack assembly. A common type of a battery model comprises an equivalent circuit model through which current-voltage characteristics may be obtained for the model battery system. The characterization of the battery cell may be calculated by real-time parameter estimation approaches on battery models using direct battery measurements. The battery cell charge state estimation may for example be based on measured battery current inputs and a battery terminal voltage. By the equivalent circuit model of the battery cell, it becomes possible to determine a state temperature of a battery cell. As such, it is possible to monitor the state temperature of a battery cell of the battery system.

As mentioned above, the control unit 8 is arranged to determine the maximum operational power level of the ESS for the given time period based on the determined acceptable temperature increase of the ESS. In this example, the maximum operational power level refers to the maximum state-of-power (SOP) level of a battery pack assembly 4 comprising Li-ion battery cells. One example of determining the maximum SOP level of the battery pack assembly by the control unit will now be further described. The example is here described for a vehicle operation where the electric propulsion system requests a certain power output from the battery pack assembly. To meet this request, the battery pack assembly is generally operated or arranged to deliver a certain SOP level for a certain period of time, corresponding to the given time period t. During the period when the battery pack assembly delivers the requested or demanded SOP, there is also heat generated from the battery pack assembly due to the operation and the characteristics of the battery pack assembly. More specifically, it has been observed that there is a correlation between the level of demanded SOP for the given time period and the amount of heat $P_{heat}$ generated in a battery cell. The heat is at least partly generated due to so called Ohmic losses (or Ohmic resistance). Accordingly, for a given SOP request from the battery pack assembly, there is generated a corresponding heat ($P_{heat}$) in the battery cell. Moreover, it has been observed that the generated heat in the battery cell generally results in a change of the cell internal temperature T. When the battery pack assembly delivers the requested SOP, there is generally also a heat transfer $P_{transf}$ from the battery cell to the surroundings or the external environment (of the battery cell and battery pack assembly).

In view of the above observations, the following thermal relationship for a given battery cell can be formulated:

$$c_p \times m \times \frac{\partial T}{\partial t} = P_{heat} - P_{transf} \quad \text{(Eq. 1)}$$

wherein
 $c_p$ is the specific heat capacity of the battery cell;
 m is the mass of the battery cell;
 T is the estimated cell internal temperature (i.e. state temperature);

$$\frac{\partial T}{\partial t}$$

is the time derivate of the cell internal temperature of the battery cell;
 $P_{heat}$ is the heat generated in a battery cell; and
 $P_{transf}$ is the heat transfer from the battery cell to the environment.

Based on the thermal relationship defined in Equation 1 above, it becomes possible to predict a future cell temperature $T_{future}$ by determining the change in temperature over time, i.e. $\partial T/\partial t*dt$ of the battery cell for the given time period dt for an assumed power level. To derive the cell temperature at the end of the time prediction horizon $t_{end}$, i.e. the predicted cell temperature $T_{future}$, the differential equation (1) needs to be solved. One possible approach to solve the above differential equation is by numerical Euler integration.

From the correlation between power and heat and in view of the thermal relationship defined in Equation 1, it also becomes possible to determine the maximum SOP for the given time period based on the above relationship with respect to an acceptable increase in temperature for the given period. The maximum SOP for the given time period may be derivable from $P_{heat}-P_{transf}$. The increase in temperature for the given period may e.g. correspond to the change in temperature from the start of the time period to the end of the time period. In order to ensure that the increase in temperature for the given time period does not exceed a temperature level that may have a negative impact on the overall power capacity of the battery pack assembly, the acceptable temperature increase is defined with respect to a temperature threshold $T_t$. In one example, the temperature threshold is defined by a predefined safety temperature level of the battery cell, herein also denoted as $T_{max\ safety}$. The $T_{max\ safety}$ thus corresponds to a critical temperature level. The $T_{max\ safety}$ may e.g. relate to a certain predefined maximum temperature level of the battery pack assembly for safety reasons. The safety temperature level of the battery cell is thus a static operational temperature. Further, the safety temperature level is generally derivable from the manufacturer of the battery pack assembly 4 and subsequently stored in the control unit 8. The control unit is typically arranged to compare the state temperature of the battery pack assembly with the safety temperature level of the battery pack assembly to ensure that the state temperature does not exceed the safety temperature level of the battery pack assembly. If the state temperature of the battery pack assembly exceeds such a safety temperature level, the control unit is generally configured to deactivate the battery pack assembly in order to protect the battery cells for safety reasons, or at least reduce the available power supply from the battery pack assembly. Such safety temperature level is generally set with a high safety margin by the battery manufacturer.

In view of the above, the maximum SOP for the given time period is here determined based on a temperature threshold, $T_t$, corresponding to the $T_{max\ safety}$ level. More specifically, the maximum SOP corresponds to an SOP level in which the change in temperature over time, i.e. $\partial T/\partial t*dt$, does not exceed the $T_{max\ safety}$ level. It should also be readily appreciated that $\partial T/\partial t*dt$ may only be valid for calculating the change in temperature for a short time, for example in order of seconds. Therefore, it is generally desirable to perform a numerical calculation to derive the temperature change for a longer time period as $\partial T/\partial t$ is changing during longer time periods, for example periods in order of minutes.

In order to provide a more conservative temperature threshold for determining the acceptable temperature increase of the battery pack assembly, the temperature threshold can be defined with respect to a maximum allowable temperature level of the battery pack assembly to extend the operational life of the battery pack assembly. The maximum allowable temperature level of the battery pack assembly prolonging the operational life of the battery pack assembly is herein denoted as the $T_{max\ degrading}$, being a temperature level indicative of a maximum allowable temperature level of the battery pack assembly for reducing ageing or degrading of the battery cells. In other words, the $T_{max\ degrading}$ level contains temperature data of the maximum allowable temperature of the battery pack assembly in respect of the operational life time of the battery pack assembly, i.e. a maximum allowable temperature of the battery pack assembly prolonging the operational life of the battery pack assembly. Such a $T_{max\ degrading}$ level is typically desirable to take into account when defining the allowable temperature increase of the battery pack assembly because a high temperature of the battery cells generally has a negative effect on cell lifetime due to accelerated ageing. Ageing, or degrading, results in reduction of power capability of the cell and more internal heat generation. Ageing also typically correlates with the performance and usage of the battery pack assembly over time. Therefore, the $T_{max\ degrading}$ corresponds to the operational life time temperature level of the battery. The operational life time of the battery pack assembly is generally a measure of battery performance and longevity, which can be quantified in a number of different ways, e.g. as run time on a full charge or as the number of charge cycles until the end of useful life. As such, the $T_{max\ degrading}$ level is a dynamic operational temperature level that generally depends on the charge and discharge activity of the battery pack assembly. That is, the operational life time of the battery pack assembly may change depending on the ordinary use of the battery pack assembly and the vehicle due to increased charge and discharge activity. At least for these reasons, the $T_{max\ degrading}$ level is a variable temperature level that changes based on the ordinary use of the battery pack assembly and the vehicle.

In this example, the $T_{max\ degrading}$ level is thus based on the charge and discharge activity of the battery pack assembly, and an appropriate threshold level of the $T_{max\ degrading}$ level may be derivable from data relating to the charge and discharge activity of the battery pack assembly. Typically, such data is transferred from the battery pack assembly to the control unit during ordinary use of the vehicle. In other words, such data is generally stored in the control unit.

In view of the above, in another example, the maximum SOP for the given time period is determined based on a temperature threshold $T_t$ corresponding to the $T_{max\ degrading}$ level. More specifically, the maximum SOP corresponds to a SOP level in which the change in temperature over time, i.e. $\partial T/\partial t * dt$, does not exceed the $T_{max\ degrading}$ level.

Depending on the operation of the vehicle, the control unit is arranged to regulate the ESS based on the maximum SOP determined by means of any one of the $T_{max\ safety}$ level and $T_{max\ degrading}$ level. Generally, during ordinary driving of the vehicle, the control unit is arranged to regulate the ESS based on the $T_{max\ degrading}$ level. However, in some urgent traffic situations, such as during an overtaking, the control unit may be arranged to regulate the ESS based on the $T_{max\ safety}$ level.

If necessary, the control unit may also be configured to determine the SOC for the battery pack assembly and/or for each one of the battery pack. The SOC can be determined based on the algorithm:

$$SOC = \frac{Q_{act}}{Q_{batt}} \times 100 \quad \text{(Eq. 2)}$$

wherein
SOC is the level of charge at the present moment of the battery pack assembly;
$Q_{act}$ is the amount of remaining capacity of the battery pack assembly; and
$Q_{batt}$ is the rated nominal capacity at the present age of the calculation Turning now to FIG. 3, there is depicted a flowchart of a method according to example embodiments of the invention. The method 100 is intended for determining an operational parameter indicative of the power capability of the ESS 10 of the vehicle 5 and/or 50, as described in relation to FIGS. 1A, 1B and 2. The sequences of the method are typically performed by the control unit 8, as described above in relation to the FIGS. 1A, 1B and 2.

The method initially comprises a step 110 of determining a state temperature of the battery pack assembly. By way of example, the state temperature of the battery pack assembly can be determined by data indicate of the temperature of the battery pack assembly, as described above in relation to FIG. 2. Hence, in this example, the step 110 comprises the step of obtaining data indicative of the temperature of the battery pack assembly. The data indicative of the temperature of the battery pack assembly can be gathered from measuring the temperature level of the battery cells of the battery pack assembly, as mentioned above. In addition, or alternatively, the temperature level of the battery pack assembly can be gathered from measuring the temperature of the cooling medium arranged to regulate the temperature of the battery pack assembly.

Typically, although not strictly required, the step 110 of determining a state temperature of the battery pack assembly is performed by the control unit 8, and by means of the temperature sensor unit 6, as described in relation to FIG. 2.

In the following step 120, the method determines an acceptable temperature increase of the battery pack assembly for the given time period based on the determined state temperature of the battery pack assembly and a maximum temperature threshold of the battery pack assembly. The step of determining the acceptable temperature increase of the battery pack assembly is generally determined at the control unit 8, as described in relation to FIG. 2.

Further, in this example embodiment, the maximum temperature threshold is indicative of a safety operational temperature level of the battery pack assembly. More specifically, as described above, the temperature threshold is defined by the predefined critical safety temperature level of the battery cell, i.e. the $T_{max\ safety}$, being a predefined maximum temperature level defined so as to ensure a safe and secure charge and discharge of the battery pack assembly. The safety operational temperature level of the battery cell is a static operational temperature, which in this example is derivable from the manufacturer of the battery pack assembly 4. Data relating to the safety operational temperature level is generally stored in the control unit 8.

In addition, or alternatively, the maximum temperature threshold is indicative of a maximum allowable temperature level of the battery pack assembly prolonging the operational life of the battery pack assembly, which here is denoted as an operational life time temperature level, $T_{max\ degrading}$, of the battery pack assembly. As mentioned herein, the operational life time of the battery is generally a measure of battery performance and longevity, which can be quantified in a number of different ways, e.g. as run time on a full charge or as the number of charge cycles until the end of useful life. In this example, the operational life time temperature level contains temperature data of the maximum allowable temperature of the battery pack assembly in respect of the operational life time of the battery pack assembly, i.e. a maximum allowable temperature of the battery pack assembly prolonging the operational life of the battery pack assembly. Further, in this example, the operational life time temperature level is derivable from data relating to the charge and discharge activity of the battery.

Typically, such data is transferred from the battery pack assembly to the control unit during ordinary use of the battery pack assembly, and may be stored in the control unit.

The maximum temperature threshold value can thus be a predetermined value stored in the control unit. In addition, the maximum temperature threshold value is typically updated based on the ordinary use of the battery pack assembly.

The given time period is typically a predefined static time period or a dynamic time period updated during operation of the vehicle. The static time period is a value stored in the control unit. The dynamic time period is a time period determined by the control unit during use of the battery pack assembly and the vehicle. In this example, the given time period corresponds to about 10 minutes.

Subsequently, the method comprises the step 130 of determining a maximum SOP level (i.e. a maximum operational power level) of the battery pack assembly for the given time period based on the determined acceptable temperature increase of the battery pack assembly. The step 130 of determining the maximum SOP of the battery pack assembly, as mentioned herein, is generally determined at the control unit 8, as described in relation to FIG. 2.

For the example when the temperature threshold is defined by the predefined safety temperature level of the battery cell, i.e. the $T_{max\ safety}$, the acceptable temperature increase is determined based on the state temperature and with respect to a temperature threshold defined by the $T_{max\ safety}$. Accordingly, the maximum SOP for the given time period is derivable from the equation (1) above with the conditions that the estimated cell internal temperature at the start of the time prediction period corresponds to the determined state temperature, while the predicted cell temperature at the end of the time prediction period corresponds to the $T_{max\ safety}$ level. More specifically, the maximum SOP corresponds to the SOP level in which the change in temperature over time, i.e. $\partial T/\partial t * dt$, does not exceed the $T_{max\ safety}$ level.

For the example when the temperature threshold is defined by the predefined safety temperature level of the battery cell, i.e. the $T_{max\ degrading}$, the acceptable temperature increase is determined based on the state temperature and with respect to a temperature threshold defined by the $T_{max\ degrading}$. Accordingly, the maximum SOP for the given time period is derivable from the equation (1) above with the conditions that the estimated cell internal temperature at the start of the time prediction period corresponds to the determined state temperature, while the predicted cell temperature at the end of the time prediction period corresponds to the $T_{max\ degrading}$ level. More specifically, the maximum SOP corresponds to the SOP level in which the change in temperature over time, i.e. $\partial T/\partial t * dt$, does not exceed the $T_{max\ degrading}$ level.

Further, in this example embodiment, the method generally comprises the optional step of comparing the maximum SOP determined based on the acceptable temperature increase defined by the temperature threshold indicative of the $T_{max\ safety}$ level with the maximum SOP determined based on the acceptable temperature increase defined by the temperature threshold indicative of the $T_{max\ degrading}$ level.

In one example, the maximum SOP level of the battery pack assembly is determined for a number of different time periods based on the determined acceptable temperature increase of the battery pack assembly. Accordingly, the method is configured to determine e.g. the level of current and the level of power that may be charged or discharged from the battery pack assembly without exceeding given temperature limits, such as the battery pack assembly safety temperature level and the battery pack assembly operational life time temperature level.

By way of example, the maximum SOP level of the battery pack assembly is determined by multiplying the number of individual battery packs with the power of the individual battery packs. This step of the example embodiments may for example be performed by the control unit.

Figure 3:
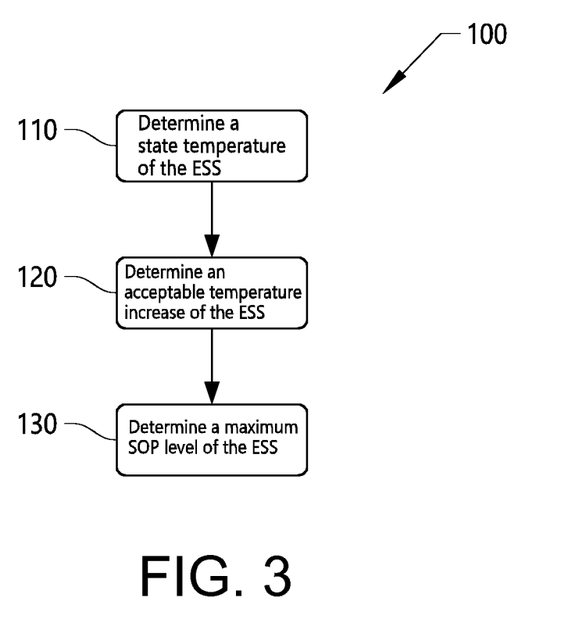
FIG. 3 is a flow-chart of a method according to an example embodiment of the invention, in which the method comprises a number of steps for controlling the energy storage system of the electric propulsion system in FIG. 2.
Figure 4:
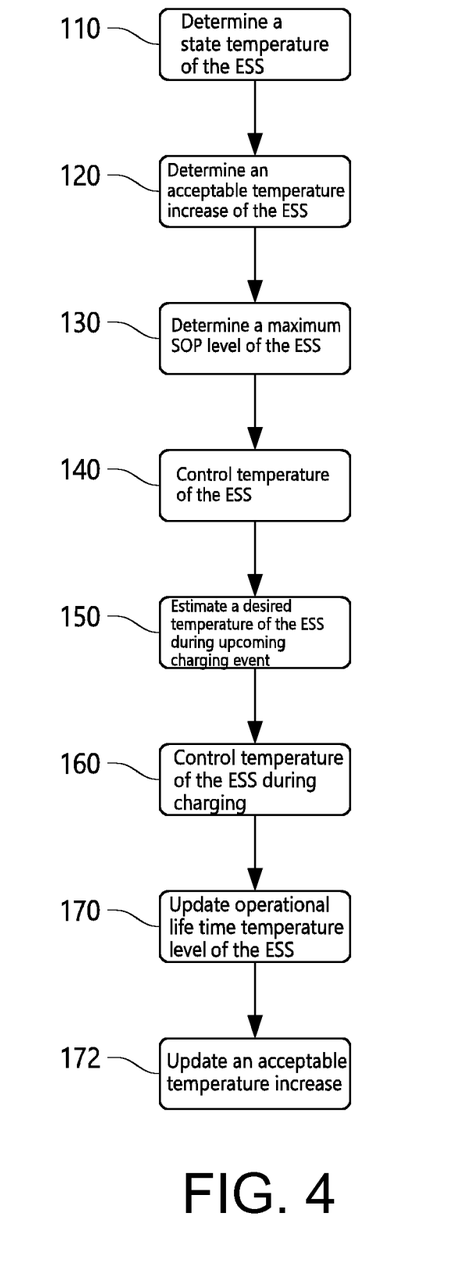
FIG. 4 is a flow-chart of additional steps of the method in FIG. 3 according to an example embodiment of the invention, in which the method comprises a number of steps for controlling the energy storage system of the electric propulsion system in FIG. 2.

Turning now to FIG. 4, there is depicted some additional optional steps of the method according to the example embodiment described in relation to FIG. 3. In other words, the method 100 as described in FIG. 4 comprises the steps 110, 120 and 130 as described above in relation to FIG. 3. While referring to the example embodiment as depicted in FIG. 4, the method 100 after step 130 here performs an additional step 140 of controlling a temperature of the battery pack assembly based on the determined maximum operational power level of the battery pack assembly. Such controlling of the battery pack assembly can be performed in several different ways. By way of example, the determined maximum operational power level is transmitted to the control unit arranged for controlling the thermal management of the battery pack assembly, e.g. the cooling system of the battery pack assembly. The thermal management system subsequently regulates the flow of coolant and/or the temperature of the coolant for regulating the temperature of the battery pack assembly.

Controlling the temperature of the battery pack assembly can be performed based on the maximum SOP determined by means of any one of the $T_{max\ safety}$ level and $T_{max\ degrading}$ level. Thus, when the method comprises the step of comparing the maximum SOP determined based on the $T_{max\ safety}$ level with the maximum SOP determined based on the $T_{max\ degrading}$ level, the method typically comprises the step of controlling the temperature of the battery pack assembly based on either the maximum SOP determined by the $T_{max\ safety}$ level or the maximum SOP determined by the $T_{max\ degrading}$ level. To this end, the method may control the temperature of the battery pack assembly depending on the operation of the vehicle. Generally, during ordinary driving of the vehicle, the control unit is arranged to regulate the battery pack assembly based on the $T_{max\ degrading}$ level. However, in some urgent traffic situations, such as during an overtaking, the control unit may be arranged to regulate the temperature of the battery pack assembly based on the $T_{max\ safety}$ level.

Typically, although not strictly required, the method further comprises the step 150 of receiving an indication of an up-coming charging event and the step of estimating a desired temperature of the battery pack assembly at the up-coming charging event based on the indication of the up-coming charging event. Typically, the desired temperature of the battery pack assembly corresponds to the charging starting temperature of the battery pack assembly at the charging station.

Subsequently, the method performs the step 160 of controlling a temperature of the battery pack assembly based on the determined maximum operational power level of the battery pack assembly and the estimated desired temperature of the battery pack assembly at the up-coming charging event.

In driving situations where the vehicle may require electrical power from all battery packs of the electrical energy storage system, e.g. at a steep up-hill slope or during an overtaking, the method may also re-evaluate the required operational power. Based on the re-evaluation process, the method can determine to re-evaluate the operational life time temperature level of the battery pack assembly in response to a change in an operational condition of the battery pack assembly. Thus, in an optional step 170, the method updates the operational life time temperature level of the battery pack assembly in response to a change in an operational condition of the energy storage system. In addition, if the method comprises the step 170, the method here further comprises the step 172 of updating the acceptable temperature increase for the given time in response to the change in an operational condition of the energy storage system.

As mentioned above, it is to be noted that the steps of the method is typically performed by the control unit 8 during use of the electrical energy storage system 10 by the electric propulsion system 20. Thus, the control unit is configured to perform any one of the steps of any one of the example embodiments as described above in relation to the FIGS. 1-4. In particular, the control unit 8 is configured to determine a state temperature of the ESS, and wherein the control unit is further configured to determine an acceptable temperature increase of the ESS for a given time period based on the state temperature of the ESS and a maximum temperature threshold of ESS, the maximum temperature threshold being indicative of any one of a safety temperature level of the ESS and an operational life time temperature level of the ESS; and to determine a maximum operational power level of the ESS for the given time period based on the determined acceptable temperature increase of the ESS.

It is to be understood that the present invention is not limited to the embodiments described above and illustrated in the drawings; rather, the skilled person will recognize that many changes and modifications may be made within the scope of the appended claims. For example, although the present invention has mainly been described in relation to an electrical truck, the invention should be understood to be equally applicable for any type of electrical vehicle, in particular an electrical bus, an electrical car or the like.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for determining an operational parameter indicative of the power capability of an energy storage system (ESS) of a vehicle, wherein the method comprises the steps of:
determining a state temperature of the ESS;
determining a first acceptable temperature increase of the ESS for a given time period from the determined state temperature of the ESS to a maximum temperature threshold of the ESS being defined by a safety temperature level ($T_{max\ safety}$) of the ESS, and further determining a second acceptable temperature increase of the ESS for the given time period from the determined state temperature of the ESS to a maximum temperature threshold being defined by an operational life time temperature level ($T_{max\ degrading}$) of the ESS, wherein the operational life time temperature level is based on the charge and discharge activity of the battery, and wherein the operational life time temperature level is lower than the safety temperature level;
determining a first maximum operational power level of the ESS for the given time period based on the determined first acceptable temperature increase of the ESS and further determining a second maximum operational power level of the ESS for the given time period based on the determined second acceptable temperature increase of the ESS; selecting the determined first maximum operational power level of the ESS if the maximum temperature threshold is the ESS safety temperature level or selecting the determined second maximum operational power level of the ESS if the maximum temperature threshold is the ESS operational life time temperature level; and controlling a temperature of the ESS based on the selected maximum operational power level of the ESS.

2. Method according to claim 1, further comprising the step of receiving an indication of an up-coming charging event and the step of estimating a desired temperature of the ESS at the up-coming charging event based on the indication of the up-coming charging event.

3. Method according to claim 2, further comprising the step of controlling the temperature of the ESS based on the determined maximum operational power level of the ESS and the estimated desired temperature of the ESS at the up-coming charging event.

4. Method according to claim 1, further comprising updating the ESS operational life time temperature level in response to a change in an operational condition of the ESS.

5. Method according to claim 4, further comprising the step of updating the acceptable temperature increase for the given time in response to the change in an operational condition of the ESS.

6. Method according to claim 1, wherein the given time period is a predefined static time period or a dynamic time period updated during operation of the vehicle.

7. Method according to claim 1, in which the steps of the method is performed by a control unit during use of the ESS by an electric propulsion system.

8. Method according to claim 1, wherein the ESS is a battery unit assembly having a plurality of connected battery units, the battery unit assembly is comprised in the vehicle for providing traction power to the electric propulsion system.

9. A non-transitory computer readable medium carrying a computer program comprising program code for performing the steps of claim 1 when said program code is run on a computer.

10. An energy storage system for a vehicle, the energy storage system (ESS) comprising a multiple number of battery units connectable to form a battery unit assembly, and a control unit configured to determine a state temperature of the ESS, and wherein the control unit is further configured to determine a first acceptable temperature increase of the ESS for a given time period from the determined state temperature of the ESS to a maximum temperature threshold of the ESS being defined by a safety temperature level ($T_{max\ safety}$) of the ESS, and further to determine a second acceptable temperature increase of the ESS for the given time period from the determined state temperature of the ESS to a maximum temperature threshold being defined by an operational life time temperature level ($T_{max\ degrading}$) of the ESS, wherein the operational life time temperature level is based on the charge and discharge activity of the battery, wherein the operational life time temperature level is lower than the safety temperature level; and to determine a first maximum operational power level of the ESS for the given time period based on the determined first acceptable temperature increase of the ESS and further to determine a second maximum operational power level of the ESS for the given time period based on the determined second acceptable temperature increase of the ESS; to select the determined first maximum operational power level of the ESS if the maximum temperature threshold is the ESS safety temperature level or select the determined second maximum operational power level of the ESS if the maximum temperature threshold is the ESS operational life time temperature level; and to control a temperature of the ESS based on the selected maximum operational power level of the ESS.

11. An electric propulsion system for a vehicle, the electric propulsion system comprising an energy storage system according to claim 10, and an electrical motor for providing power to the vehicle, the energy storage system being connected to the electrical motor to provide power to the electrical motor.

12. A vehicle, such as a fully or hybrid electrical vehicle, comprising an energy storage system according to claim 10.

\* \* \* \* \*